US00RE35137E

United States Patent [19]

Bryans et al.

[11] E Patent Number: Re. 35,137

[45] Reissued Date of Patent: Jan. 2, 1996

[54] HIGH SPEED SERIAL DATA LINK

[75] Inventors: Mark A. Bryans, Dallas; James H. Cline, Allen; Francis B. Frazee, Plano, all of Tex.; Lark E. Lehman, Colorado Springs, Colo.

[73] Assignee: Texas Instruments Incorporated, Dallas, Tex.

[21] Appl. No.: 991,682

[22] Filed: Dec. 16, 1992

Related U.S. Patent Documents

Reissue of:

[64] Patent No.: 4,979,185
Issued: Dec. 18, 1990
Appl. No.: 256,954
Filed: Oct. 30, 1989

[51] Int. Cl.[6] ..... H04L 25/49

[52] U.S. Cl. ..... 375/293; 375/365; 371/47.1; 371/49.1; 341/95

[58] Field of Search ..... 375/20, 114; 359/109, 359/110; 341/95; 371/47.1, 49.1; 455/608

[56] References Cited

U.S. PATENT DOCUMENTS 4,027,152 5/1977 Brown et al. ..... 375/17
4,571,735 2/1986 Furse ..... 375/20
4,761,797 8/1988 Bickers ..... 375/113

FOREIGN PATENT DOCUMENTS 0028318 3/1978 Japan ..... 375/113

OTHER PUBLICATIONS

Fike, John L.; Understanding Telephone Electronics, 1983 pp. 8–14 to 8–24.
Debacker et al; "Digital Data Transmission"; IBM Technical Disclosure Bulletin vol. 11; No. 2; Jul. 1968 pp. 200–201.
Donnan; "Transmission Synchronizing Method;" IBM Technical Disclosure Bulletin; vol. 11; No. 11, Apr. 1969; p. 1570.
No Author; "Unique Word and Ending Word Detection for Synchronizing & Burst Limitation;" IBM Technical Disclosure Bulletin, vol. 28, No. 4, Sep. 1985 pp. 1377–1380.

*Primary Examiner*—Stephen Chin
*Assistant Examiner*—Bryan E. Webster
*Attorney, Agent, or Firm*—Robert D. Marshall, Jr.; James C. Kesterson; Richard L. Donaldson

[57] ABSTRACT

A high bit-rate serial communications link encodes data by inserting non-data 0's and 1's. These extra bits are removed by a decoder at the receiving end of the link. Transmission of data can be made along optical fibers.

14 Claims, 5 Drawing Sheets

HIGH SPEED SERIAL DATA LINK

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates generally to communication systems, and more specifically to a method and device for transmitting serial data at very high speeds.

Transferring high speed digital signals between various parts of a computer system, or between systems, is a common requirement. In order to increase bandwidth, parallel data transmission is used wherever possible. However, due to cost, weight, interference (noise), and electrical loading considerations, parallel transmission is not feasible for many systems. In order to simplify the communications problem, data can be transmitted serially. This requires less hardware for the actual communications link. However, parallel data must be converted to serial form for the transmission. The bit rate for the transmission of serial data must be much higher than that required to transmit data in parallel form.

This high bit rate requirement has limited the usefulness of the serial data link in high speed communications systems in the past. However, faster bit rates are becoming available with current technology, and the use of fiber optics as the transmission medium holds the promise of much higher bit rates in the future. Current fiber optic transmission and reception hardware is quite complex, requiring a large number of integrated circuits for each function. Such implementations are not pratical in low cost systems, or in some systems having severe weight and space restrictions, such as on board an aircraft or a satellite.

It would be desirable for a serial data link using fiber optic communications to utilize high bit rate data transmission, and to be realizable in a small number of relatively inexpensive integrated circuits.

Therefore, according to the present invention, a method for communicating high speed serial data includes encoding data with both zero and one insertion, and decoding the received serial data using zero and one deletion. The encoding and decoding functions can be easily implemented on a single integrated circuit for each function, and are capable of transmitting data at very high bit rates.

The novel features which characterize the present invention are deemed by the appended claims. The foregoing and other objects and advantages of the present invention will hereafter appear, and for purposes of illustration, but not of limitation, a preferred embodiment is shown in the accompanying drawings.

DESCRIPTION OF THE PREFERRED EMBODIMENTS

Figure 1:
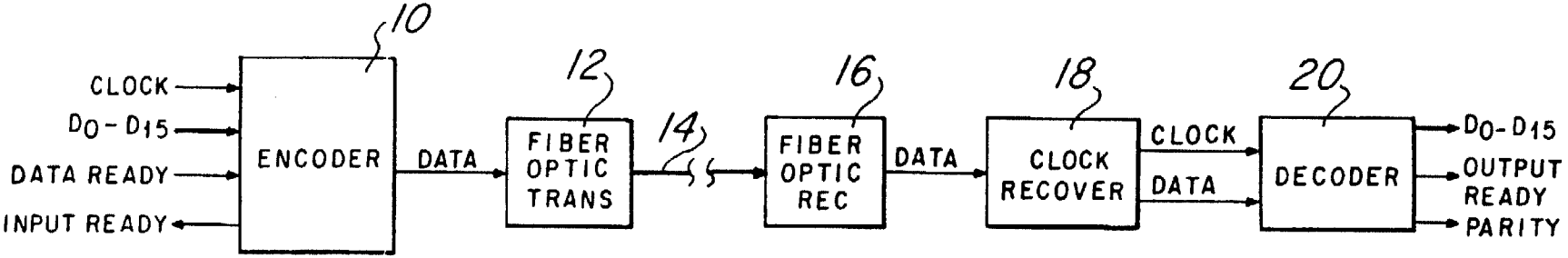
FIG. 1 is a block diagram of a communications system which utilizes the present invention.

FIG. 1 shows a serial communications link suitable for transmitting data between two parallel devices. The following description assumes that data word width of the parallel devices is 16 bits; however, other word widths can be used as will become apparent to those skilled in the art in conjunction with the following description.

A 16 bit data word is presented to an encoder device 10 on lines $D_0$–$D_{15}$. A CLOCK signal is also presented to the encoder device 10. The encoder device 10 converts the data from parallel to serial form, and sends it to a fiber optical transmitter 12. The data is transmitted along a fiber optic 14 to a fiber optic receiver 16, which presents digital data to a clock recover circuit 18. The clock recover circuit 18 extracts the clock from the data itself, and presents both the CLOCK and the DATA signals to a decoder circuit 20. The decoder circuit 20 converts the serial data into parallel form, and outputs it on data lines $D_0$–$D_{15}$.

When the encoder circuit 10 is ready to accept a parallel data word for conversion, it signals its status on the INPUT READY line. When the parallel system (not shown) is ready, that is, the data on the input data lines $D_0$–$D_{15}$ is valid, the DATA READY line is signalled. At that time, the encoder circuit 10 begins the parallel to serial conversion and transmission.

In a similar manner, the decoder circuit 20 signals on the OUTPUT READY line when it has received a complete data word. In addition, in order to decrease communication sensitivity to noise, a PARITY signal is output from the decode circuit when a parity error is detected in transmission.

The fiber optic link used in the system just described has relatively severe bandwidth restrictions. These bandwidth restrictions place certain requirements on the data which is transmitted, and such requirements are met by encoding the data prior to transmission as will be described below. In addition, the system is preferably operated asynchronously, requiring that a sync pulse be transmitted along the serial link prior to transmission of each data word.

As is known in the art, the amplifiers associated with fiber optics data links can be viewed as band pass filters; they have a low speed limitation as well as a high speed limitation. Typical amplifiers must be operated so that the maximum time between a data transition (0-1, or 1-0) falls within a well defined range. This can be expressed as $$T_{min}>T>T_{max}$$

where $T_{min}$ is the minimum length of time between data transitions, and $T_{max}$ is the maximum time between transitions.

Most fiber optic systems are capable of handling a large enough bandwidth that the ratio of $T_{max}/T_{min}$ is 6:1. $T_{min}$ occurs when a string of alternating 0's and 1's are transmitted. $T_{max}$ is a consideration when a long string of consecutive 0's or 1's are transmitted. For the desired ratio of 6:1, the transmitted data must be encoded so that no more than five consecutive 0 bits are transmitted, and that no more than five consecutive 1's are transmitted. It is also necessary that a unique sync signal be communicated which cannot be the same as the transmission of any possible data sequence. The data encoding scheme which will now be described meets these contraints.

The preferred data encoding scheme uses insertion of 1's and 0's in order to break up long data sags. Thus, whenever five consecutive 0's are transmitted, the encoder inserts a 1, not used as a data bit, in order to ensure that the $T_{max}$ restriction is met. Likewise, no more than five consecutive 1's are allowed.

A preferred sync signal consists of 11110. This is the most efficient length for the sync signal for a 16 bit word width, although other lengths could be used with this technique. Larger word widths, such asn 32 bits, can use the same sync signal, or others as my be required by the specific situation at hand.

The signal 11110 will always be read by the decoder circuit 20 as a sync signal. Therefore it is necessary that transmitted data never contain more than 3 consecutive 1's. This is accomplished by a simple counter included as part of the encoder 10 circuitry, which, when three consecutive data 1's have been transmitted, inserts a 0 regardless of the value of the next data bit. When the decoder circuitry 20 receives three consecutive 1's followed by a 0, it knows that the trailing 0 is always for encoding purposes only and discards it. Three consecutive 1's followed by a fourth 1 always signals the presence of a sync signal.

In a similar manner, the encoder circuitry 10 counts the number of consecutive 0's that have been transmitted, be they data bits, the trailing 0 of the sync signal, or 0's inserted after three consecutive 1's. After five consecutive 0's of any type have been transmitted, a 1 is always inserted into the data stream. As before, this one is for encoding purposes only, and is never a data bit. The decoder circuitry 20, after receiving five consecutive 0's always discards the 1 which is received next.

It will be appreciated that the insertion of extra 1's and 0's increases the length of the transmitted data word. This overhead is the price which must be paid in order to ensure accurate data transmission.

Also, in order to properly recognize the zync signal, each transmitted data word preferably should not end with a 1. Thus, if a 1 is the last bit transmitted for a word, an extra 0 is added to the transmission. This allows the decoder circuitry 20 at the receiving end to pick out the following sync signal.

Table 1 shows the encoding of several 16 bit words according to the above scheme. With a sync signal consisting of four 1's followed by a 0, the first three words show the worst case in terms of overhead. That is, more non-data bits are inserted in these three words than in any other 16 bit words which can be transmitted. Since 27 bits must be transmitted for one 16 bit word, the worst case overhead for the above described scheme is, including the zync signal and a parity bit, forty percent. The avenge overhead for randomly transmitted 16 bit words will, of course, be somewhat lower than this.

TABLE 1

| Data (hex) | Encoded Data |
|---|---|
| FFFF | 111101110111011101110111010 |
| OC30 | 111100000111000001110000010 |
| E186 | 111101110000011100000111000 |
| 1357 | 111100001001101010110 |
| OAF4 | 111100000110101110101 00 |

Figure 2:
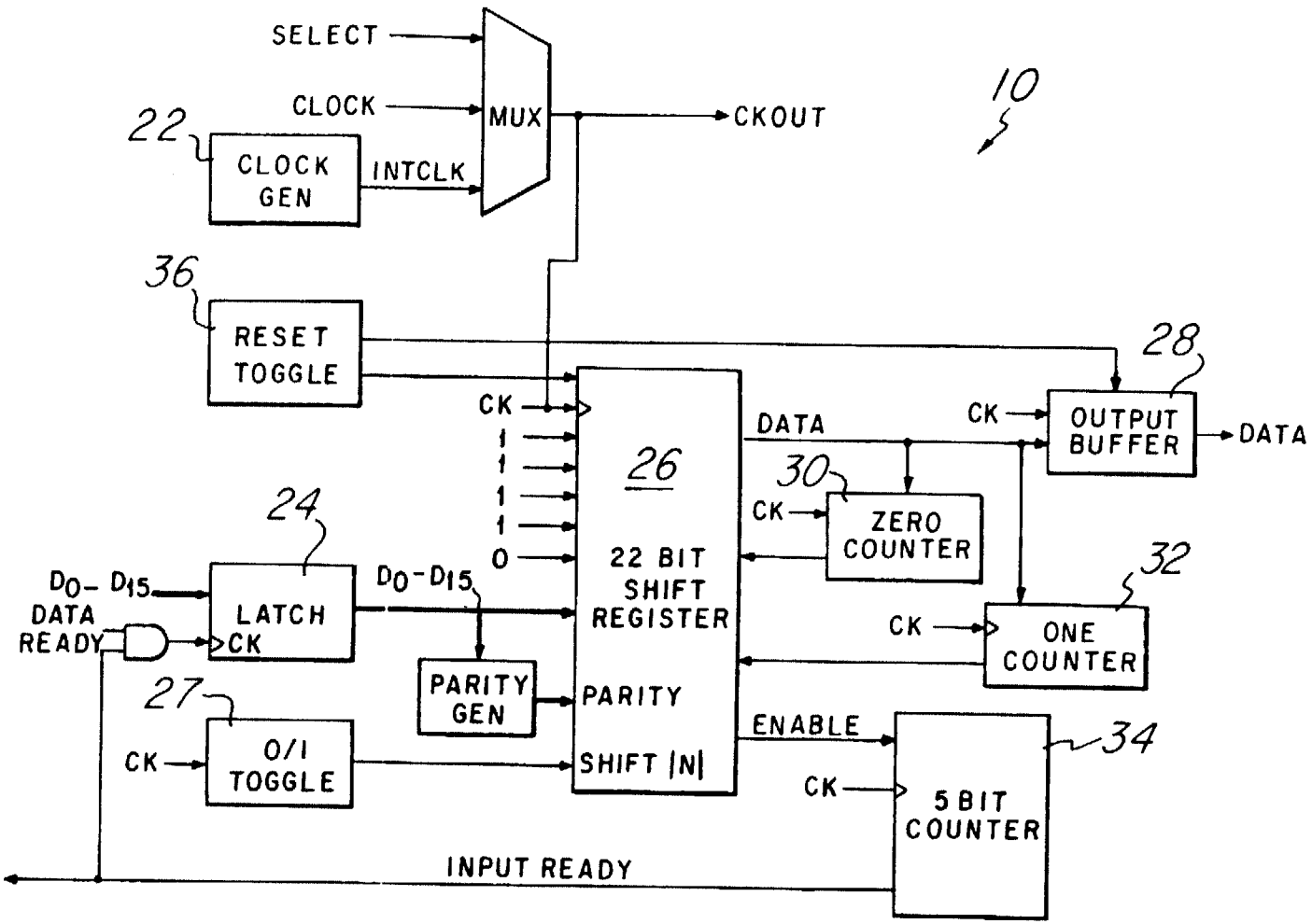
FIG. 2 is a block diagram of an encoder which encodes data for transmission according to the present invention.

Referring to FIG. 2, a block diagram for the encoder 10 is shown. The clock signal CK to be used can be generated internally as signal INTCLK in a clock generating circuit 22, or provided externally as the signal clock. A SELECT signal, preferably attached to an input pin of the integrated circuit containing the encoder 10, is used to determine whether the external or internal clock is used, The internal clock 22 can be a simple ring oscillator of the appropriate frequency, Although ring oscillators are typically not extremely well controlled, this does not present a problem since the communication is asynchronous and the receiver will extract the clock signal from the transmitted data. The clock signal CK is used to clock the remainder of the circuitry on the encoder chip 10, and is provided as an output signal CKOUT for system which require it as will be described in connection with FIG. 6.

The input data $D_0$–$D_{15}$ is held in a latch 24. When the signals INPUT READY and DATA READY are both high, the latch 24 is clocked, and loads its data into a 22 bit shift register 26. Also leaded into the shift register 26 at this time are the sync signal (11110) and a panty bit calculated from the data word. Any parity scheme can be used, with a single bit even parity scheme used in the preferred embodiment.

Also connected to the shift register 26 is a 0/1 toggle 27, typically a flip flop, which generates a continuous string of alternating 0's and 1's to be shifted into the register 26 for reasons which are described below.

Once the data has been loaded into the shift register 26, it is shifted out serially to an output buffer 28, which communicates the bit stream to the fiber optic transmitter 12.

A 0 counter 30 and a 1 counter 32 are connected to the output of the shift register 26, and count, respectively, how many consecutive 0's or 1's have been transmitted. The first four transmitted ones are ignored by the 1 counter 32, since it is known they are the sync signal. Whenever a 0 is encountered, the 1 counter 32 is reset, and whenever a transmitted 1 is encountered, the 0 counter 30 is reset. Beginning with the 0 of the sync pulse, the 0 and 1 counters 30, 31 respectively keep track of the number of 0's and 1's transmitted. Whenever five consecutive 0's are detected by the 0 counter 30, it signals the shift register 26 to cease transmitting data for one clock cycle and to place a 1 in the output data string. Whenever the 1 counter 32 detects three consecutive 1's, it signals the shift register 26 to cease transmitting data for one clock cycle and to place a 0 in the output data string. After insertion of this non-data 0 or 1, the shift register 26 continues shifting data out to the output buffer 28 at the rate of 1 bit per clock cycle.

Twenty two bits are sent by the shift register 26, not including any 0's or 1's inserted as a result of a signal from the 0 counter or 1 counter. These bits include the five sync bits, the 16 data bits and one panty bit. A 5 bit counter 34 is used to count transmission of these twenty two bits in order to determine when the next data can be loaded into the shift register 26. When the shift register 26 begins shifting the sync signal, an ENABLE signal is sent to the 5 bit counter 34. So long as this ENABLE signal is raised, the 5 bit counter 34 counts up to twenty-two. Whenever a non-data 0 or 1 is transmitted, the ENABLE signal is lowered so that the counter 34 does not increment on that clock cycle. In this manner, the counter 34 does not count the inserted, non-data 0's and 1's sent to the output buffer 28.

After twenty-two sync, data, and panty bits have been sent, the signal INPUT READY is raised, and the encode circuitry 10 is ready to accept another word. When data is shifted out of the shift register 26, and alternating series of 0's and 1's are shifted in from the 0/1 toggle 27. Thus, when the shift register 26 shifted out the current data word, it is filled with alternating 0's and 1's. If no next parallel dam word is ready to be transmitted as determined by the signal DATA READY, the shift register 26 continues transmitting 0's and 1's to the output buffer 28. This keeps the communication line active, and prevents problems which can occur in the receiver when no transitions (0-1 or 1-0) are transmitted for a time exceeding $T_{max}$. When a new parallel data word becomes available, the DATA READY signal is raised, the value is loaded from the latch 24 into the shift register 26, and the new data word is shifted out. In this manner, a bit is transmitted along the communications channel every clock cycle regardless of whether or not any actual data is being transmitted.

A reset toggle 36, which can be initiated by a reset signal into the integrated circuit or by power up, initializes the output butter 28, initializes the shift register 26, and causes the five bit counter 34 to be reset. The encoder 10 is then ready to begin receiving data for transmission.

Figure 3:
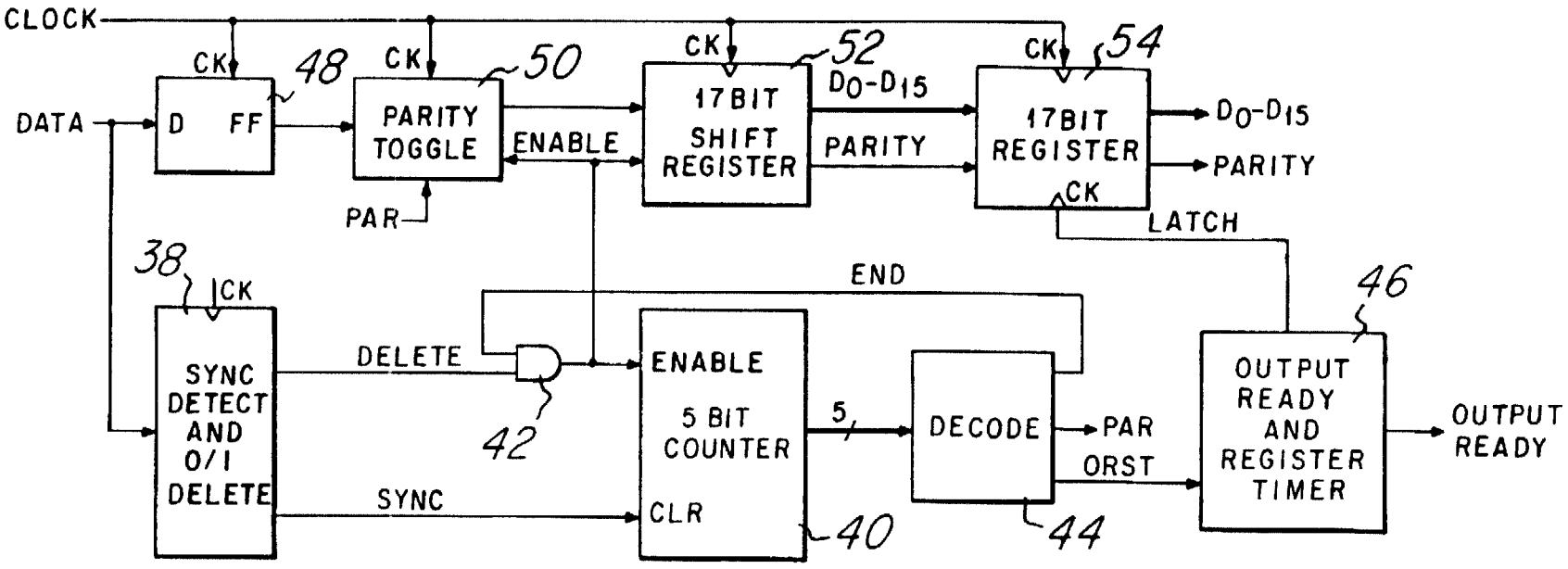
FIG. 3 is a block diagram of a decoder which decodes received data according to the present invention.

FIG. 3 shows a block diagram of the preferred decode circuit 20. In this circuit, the signal CLOCK has already been recovered by the clock recover circuit 18, and is provided to all of the internal circuitry as the signal CK. The incoming DATA stream is applied to a sync detect and 0/1 delete circuit 38. When a sync signal is detected by this circuit 38, it generates a signal SYNC which is used to clear a five bit counter 40. The five bit counter 40 functions to count to twenty-two in the same manner as the counter 34 located in the encode circuitry 10. The sync detect circuit 38 is connected to the ENABLE input of the counter 40 through a DELETE signal and an AND gate 42 to prevent the counter 40 from counting non-data 0's and 1's inserted by the encoder 10.

A decode circuit 44 coupled to the output of the counter 40 provides an END signal which goes low after the count reaches twenty-two, preventing the counter 40 from continuing. After 21 bits are counted, a PAR signal is provided for parity counting purposes as will be described. After twenty-two bits have been counted, an output ready start signal (ORST) is communicated to an output ready and register time circuit 46. This circuit 46 provides an OUTPUT READY signal which is communicated off chip, and used to indicate that a data word is available to the rest of the computer system (not shown).

The inccoming data is also supplied to a D flip flop 48 which delays it for one clock cycle, and then transmits the data to a panty toggle circuit 50. This parity toggle circuit 50 contains a flip flop internally (not shown) which contains a parity bit as currently applied to the data stream. Parity is not calculated when a non-data 0 or 1 is detected by the delete circuit 38, as controlled by the signal ENABLE. The data passes through the parity toggle circuitry 50 into a 17 bit shift register After 21 data bits have been counted by the counter 40, the signal PAR is raised, causing the current value of the panty toggle 50 to be shifted into the last bit of the shift register 52. The shift register 52 now contains 16 data bits and 1 parity bit. On the clock cycle after this parity bit is shifted into the shift register 52, the signal LATCH from the output ready circuitry 46 causes the contents of the shift register 52 to be latched into a 17 bit latch register 54. The data, and parity bit, are now available in parallel form for the remaining circuitry.

The remaining blocks of the diagram of FIG. 1 are fairly standard. Fiber optic transmission and receive circuits 12, 16 are known in the art, and any suitable such circuits can be used with the present invention. The clock recover circuitry 18 is also known in the art, and is available as a single chip implementation from several sources.

Figure 4:
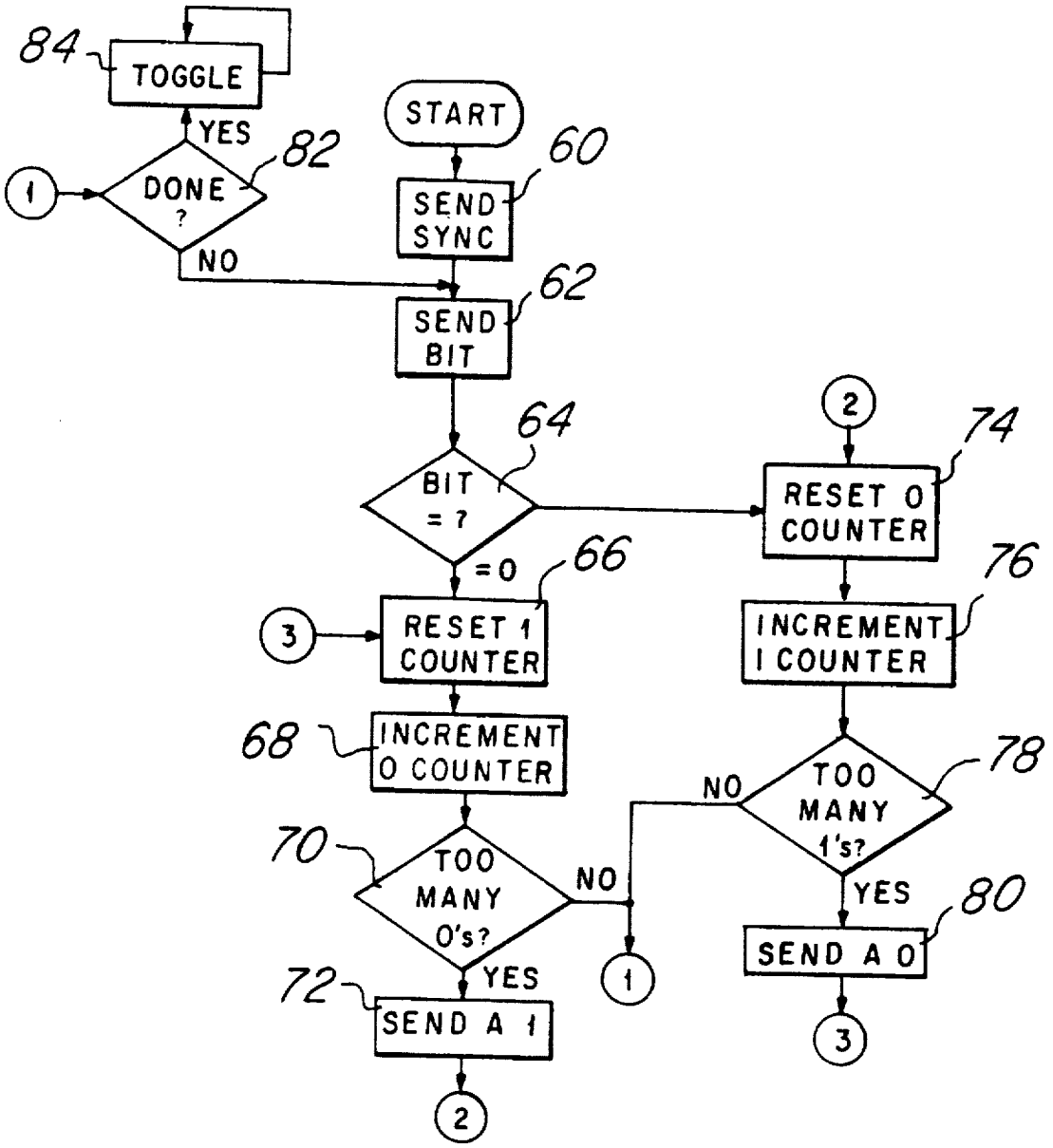
FIG. 4 is a flow chart illustrating an encoding scheme useful with the present invention.

As described above, the shift register circuitry 26 in combination with the 0 counter 30 and 0 counter 36 of the encode circuit 10 performs the data encoding scheme described above. FIG. 4 is a flow chart illustrating the logic flow by which this circuitry works.

Referring to FIG. 4, when a new data word is loaded into the shift register, a sync signal is sent 60. After the sync signal is sent, the next bit is sent 62. If the bit is a 0 (step 64), the left branch of the chart is taken, and the 1 counter is reset 66. At the same time, the 0 counter is incremented 68. If too many 0's have been sent (step 70), which in the presently described implementation is 5, a 1 is then sent 72, and control flow returns to point 2. If less than this number of 0's have been sent, control flow moves to point 1. If this is the last bit to be sent (step 82), the system toggles 1's and 0's (step 84) until another data word is loaded. If not, the flow of control returns to send the next bit 62.

If the transmitted bit is a 1 (step 64), the right branch of the flow chart is taken, and 0 counter is reset 74 and the 1 counter is incremented 76. A test is made 78 to see if too many 1's have been transmitted, which, as presently described, is 3. If less than three 1's have been sent, the flow of control returns to point 1. If three 1's have been sent, a non-data 0 is transmitted 80, and the flow of control is returned to point 3.

This flow chart describes the entire data encoding technique, Although, as described in FIG. 2, hardware was used to encode the data, it would be possible for software or mixed software/hardware implementations to be made according to the present invention. Hardware is preferred to achieve the very high bit rates desired, and the logic is not difficult to implement.

Figure 5:
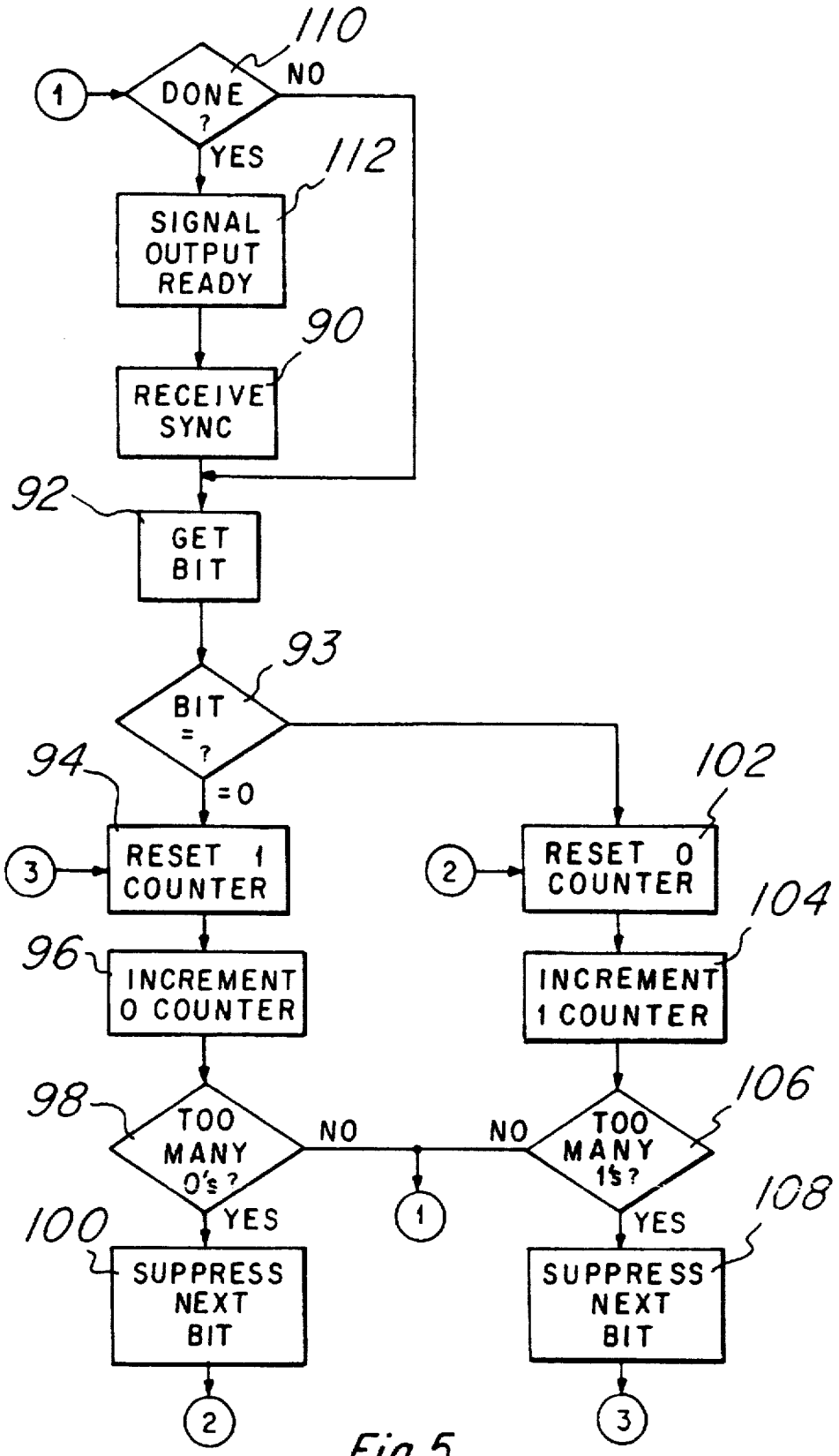
FIG. 5 is a flow chart illustrating a decoding scheme suitable for use with the present invention.

FIG. 5 shows a similar logic flow utilized by the decode circuitry. The decoding begins when a sync signal is received 90. After receiving the sync signal, the next bit is obtained 92, and tested 93 to see if it is a 0 or a 1. If the next bit is a 0, the left branch of the flow chart is taken. Internally to the sync detect and 0/1 delete circuitry, a 0 counter is reset 94, a 0 counter is incremented 96, and a test made 98 to see if too many 0's have been received. As described above, the yes branch of this test is taken if five 0's have been received. In this case, the next bit is suppressed 100, signalled by the signal DELETE shown in FIG. 3. Control then passes to point 2 of the flow chart. If the result of the bit test 93 is a 1, the 0 counter is reset 102, the 0 counter in incremented 104, and a test made 106 for the number of 1's received. If three 1's have been received, the next bit is suppressed 108 and control passes to point 3 of the flow chart.

In the case of receipt of a 0 or 1, if the number of consecutive 0's or 1's is below the critical limit (steps 98 and 106), control passes to point 1 of the flow chart. If the last bit of this number has been received 110, the output ready signal is raised 112 and the decode circuitry waits for the next sync signal. If all bits have not yet been received, the next one is obtained 92 and checked as described above.

Figure 6:
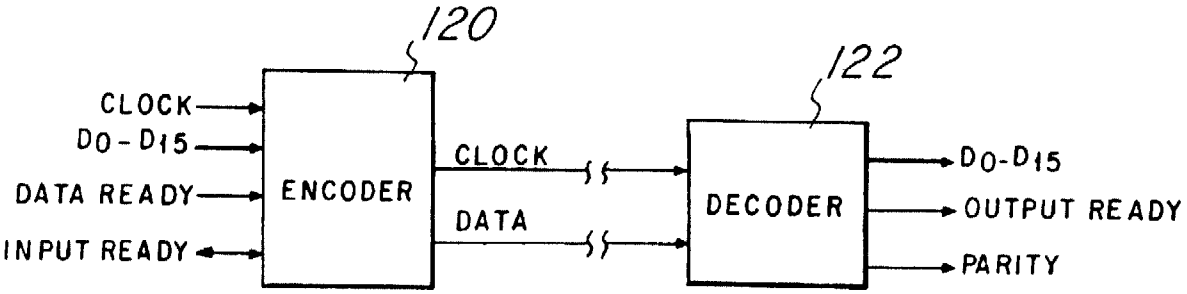
FIG. 6 is a block diagram of an alternative embodiment of a serial communication system.

Referring to FIG. 6, another embodiment of the serial communication system is shown. This system includes a direct electrical coupling of an encoder 120 and decoder 122. The CLOCK signal is supplied on a separate line from the DATA signal, so that no clock recover circuitry is required. The encode and decode circuitry 120, 122 are identical to the encoder 10 and decoder 20 of FIG. 1.

It is also possible to send the clock and data signals separately when using a fiber optic transmission system. This would require either two fiber optic transmit/receive pairs, or two different frequencies of light transmitted along the fiber which can be separated at the receiving end.

With the circuitry described above, a 20 MHz parallel system can communicate data along the serial link adequately if a 500 MHz bit rate is used for the serial data. This is fairly fast, but is easily accomplished by the use of a ring oscillator on the encode circuit 10 as described above. Since communication is asyncronous, a precisely controllable high spell clock is not required. In addition, with the operation of the system described above, a separation is maintained between the high speed serial clock and the lower spell parallel data clock used in the rest of the computer system. With on chip generation of the high speed clock, the parallel system can simply watch for the INPUT READY signal generated by the encode circuitry, and need not be concerned with syncronization of the high speed clock.

The circuitry described above can best be implemented on gallium arsenide integrated circuits, with each of the encode and decode circuitry units being integrated into a single chip. This allows a simple, high speed serial link to be realized at very low cost and with a very low part count.

The number of consecutive 0's and 1's which are allowed prior to insertion of a non-data 1 or 0 is dependent upon the characteristics of the fiber optic transmit and receive devices. As will be readily apparent to those skilled in the art, the use of both 0 insertion/deletion and 1 insertion/deletion allows the encoding scheme described above to be implemented with the desired characteristics.

The present invention ha been illustrated by the system described above, and it will become apparent to those skilled in the art that various modifications and alterations my be made thereto. Such variations fall within the spirit of the present invention, the scope of which is defined by the appended claims.

What is claimed is:

1. A method for transmitting data comprising a plurality of data words, each said data word composed of a plurality of 1's and 0's, comprising the steps of:

(a) providing said plurality of data words in a parallel representation thereof;

(b) prepending a unique signal to each data word for indicating the start of a transmitted data word;

(c) converting each prepended data word to a serial representation thereof;

(d) converting each serial representation of a prepended data word to a serial representation thereof having no more than a first preselected number of consecutive 1's and no more than a second preselected number of consecutive 0's by inserting extra 0's and 1's into said data word to convert strings of 1's and 0's therein longer than the first and second preselected numbers, respectively, into at least two shorter strings;

(e) transmitting the serial representation of (d) to a receiver;

(f) receiving the transmitted serial representation;

(g) removing the unique signal, prepended in step (b), from the received serial representation;

(h) deleting the extra 0's and 1's inserted into the serial representation in step (d); and (i) converting the serial representation of (h) into a data word.

2. A system for transmitting data using an asynchronous serial data link, comprising:

(a) an encoder for convening data words represented in parallel format into serial bit streams representing each data word, each data word having a unique start-of-word sequence, said encoder including means for insuring that no more than preselected numbers of consecutive 0's and 1's are present in each said data word including means for inserting extra 1's and 0's into sequences in a data word containing more than such preselected numbers;

(b) a decoder for detecting and removing unique start-of-word sequences and any extra 0's or 1's inserted by said encoder to convert said serial bit streams into data words; and (c) transmission means coupled to said encoder and said decoder for communicating serial bit streams from said encoder to said decoder.

3. The system of claim 2, wherein said transmission means comprises an optical system including:

an optical transmitter coupled to said encoder;

an optical receiver coupled to said decoder; and a fiber optic link coupled to said optical transmitter and to said optical receiver, said optical system having a defined bandwidth, said preselected number being determined by said defined bandwidth.

4. The system of claim 3, further comprising means, coupled to said optical receiver, for recovering a clock signal from data transmitted by said fiber optic link.

5. A method for transmitting data comprising a plurality of data words, each said data word composed of a plurality of 1's and 0's, comprising the steps (a) providing said plurality of data words in a parallel representation thereof;

(b) prepending a unique signal to each data word for indicating the start of a transmitted data word;

(c) providing an optical data link including a transmitter and a receiver, said data link having a defined bandwidth;

(d) convening each prepended word to a serial representation thereof;

(e) converting each serial representation of a prepended data word to a serial representation thereof having no more than a first preselected number of consecutive 1's and no more than a second preselected number of consecutive 0's by inserting extra 0's and 1's into said data word to convert strings of 1's and 0's longer than said first and second preselected numbers, respectively, into at least two shorter strings, said preselected number providing a data transition time less than the maximum permissible time between data transitions for the optical data link;

(f) transmitting said serial representation of (c) to a receiver;

(g) receiving the transmitted serial representation;

(h) removing the unique signal, prepended in step (b), from the received serial representation;

(i) deleting the extra 0's and 1's inserted into the serial representation in step (e); and (j) converting the serial representation of (i) into a data word.

6. The [system] *method* as set forth in claim 5 wherein step (h) further includes converting said data word into a parallel representation thereof.

*7. A method for transmitting data comprising a plurality of data words, each data word composed of a plurality of 1's and 0's, comprising the steps of:*

*(a) prepending a unique signal to each data word for indicating the start of a transmitted data word, thereby forming a prepended data word;*

(b) converting each prepended data word into an encoded data word having no more than a first preselected number of consecutive 1's and no more than a second preselected number of consecutive 0's by inserting 1's and 0's into said prepended data word to convert strings of 1's and 0's therein longer than the first and second preselected numbers, respectively into at least two shorter strings; and (c) serially transmitting said encoded data word one bit at a time.

8. The method of transmitting data of claim 7 wherein:

said step (c) includes transmitting said encoded data word via a medium having a maximum time between data transitions of $T_{max}$; and said step (b) includes preselecting said first preselected number of 1's and second preselected number of 0's whereby the maximum number of permitted consecutive 1's and the maximum number of permitted consecutive 0's in said encoded data word are transmitted in a time of less than $T_{max}$.

9. The method of transmitting data of claim 7, wherein each of said data words are provided in a parallel representation, said method further comprising:

converting each data word from the parallel representation to a serial representation.

10. The method of transmitting data of claim 7, wherein:

said step (c) includes serially transmitting said encoded data words via an fiber optic cable.

11. The method of receiving data words, each data word including a number of 1's and 0's, said method comprising the steps of:

(a) receiving serially transmitted data;

(b) searching received serially transmitted data for a unique signal;

(c) removing said unique signal from the received serially transmitted data;

(d) converting data received between receipts of said unique signal into received data words;

(e) counting the number of consecutive 1's in the received data words and removing a next bit following the receipt of a first preselected number of consecutive 1's;

(f) counting the number of consecutive 0's in the received data words and removing a next bit following receipt of a second preselected number of consecutive 0's.

12. The method of receiving data of claim 11 further comprising the steps of:

converting the data words having the next bit following receipt of said first preselected number of consecutive 1's removed and the next bit following receipt of said second preselected number of consecutive 0's removed into a parallel representation.

13. The method of receiving data of claim 11 further comprising the steps of:

recovering a clock signal from the received serially transmitted data.

14. The method of receiving data of claim 11, wherein:

said step (a) includes receiving serially transmitted date via a fiber optic cable.

* * * * *